United States Patent
Cho et al.

(10) Patent No.: US 8,294,848 B2
(45) Date of Patent: Oct. 23, 2012

(54) LIQUID CRYSTAL DISPLAY HAVING LIGHT DIFFUSION LAYER

(75) Inventors: Don-Chan Cho, Seongnam-si (KR); Jae-Byung Park, Seongnam-si (KR); Jin-Seob Byun, Seoul (KR); Hae-Il Park, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 653 days.

(21) Appl. No.: 12/542,232

(22) Filed: Aug. 17, 2009

(65) Prior Publication Data

US 2010/0079704 A1   Apr. 1, 2010

(30) Foreign Application Priority Data

Oct. 1, 2008 (KR) .................. 10-2008-0096526
Apr. 6, 2009 (KR) .................. 10-2009-0029496

(51) Int. Cl.
*G02F 1/1335* (2006.01)
(52) U.S. Cl. .............. 349/71; 349/112; 349/96; 349/97
(58) Field of Classification Search .................. 349/71, 349/112, 96, 97
See application file for complete search history.

(56) References Cited

U.S. PATENT DOCUMENTS 7,661,841 B2 * 2/2010 Kurihara et al. ............ 362/231
2002/0145685 A1 * 10/2002 Mueller-Mach et al. ....... 349/61

FOREIGN PATENT DOCUMENTS

| JP | 2007-287697 | 11/2007 |
| KR | 1020070029526 | 3/2007 |
| KR | 1020070070052 | 7/2007 |

* cited by examiner

*Primary Examiner* — Mike Qi
(74) *Attorney, Agent, or Firm* — H.C. Park & Associates, PLC (57) ABSTRACT

A liquid crystal display includes, among others, a light diffusion layer comprising a color conversion media layer and a non-conversion layer arranged on the second substrate and a backlight assembly to supply light to the first substrate and the second substrate. The backlight assembly supplies various wavelengths of lights, including blue light or UV ray. The blue rights through the liquid crystal layer enters the color conversion media layers and may generates red lights and green lights. In this case, blue lights go through non-conversion layer and diffuse and scatter out blue lights. The UV rays through the liquid crystal layer enters the color conversion media layers and may generates red light, green lights and blue lights.

38 Claims, 12 Drawing Sheets

LIQUID CRYSTAL DISPLAY HAVING LIGHT DIFFUSION LAYER

CROSS REFERENCE TO RELATED APPLICATION

This application claims priority from and the benefit of Korean Patent Application No. 10-2008-0096526, filed on Oct. 1, 2008, and Korean Patent Application No. 10-2009-0029496 filed on Apr. 6, 2009, which are hereby incorporated by reference for all purposes as if fully set forth herein.

BACKGROUND OF THE INVENTION

1. Field of the Invention

The present invention relates to a liquid crystal display.

2. Discussion of the Background

A liquid crystal display (LCD) is one of the most commonly used flat panel displays, and includes two substrates with electrodes formed thereon and a liquid crystal layer interposed between the two substrates. In the LCD, a voltage is applied to the electrodes to realign liquid crystal molecules of the liquid crystal layer to thereby regulate the transmittance of light passing through the liquid crystal layer.

Among LCDs, an LCD having a structure in which field generating electrodes are respectively formed on two display panels is widely used. Among the two display panels, a plurality of pixel electrodes and thin film transistors are arranged in a matrix format on one display panel (hereinafter, referred to as "a thin film transistor array panel"), and red, green, and blue color filters are formed on the other display panel with a common electrode covering the entire surface of the panel (hereinafter, referred to as "a common electrode panel").

However, such type of LCD may lose light when passing through the polarizers and the color filters. To reduce the light loss and make a more efficient LCD, a photo-luminescent liquid crystal display (PL-LCD) has been developed to have a color conversion material instead of color filters.

The PL-LCD uses a color conversion media (CCM) instead of the color filters. In the PL-LCD device, an ultraviolet (UV) light or a bluish light that is generated from a light source and controlled by a liquid crystal layer is irradiated onto a color conversion media layer so that a visible light is generated from the color conversion media layer, thereby displaying an image. The UV light and the bluish light have relatively short wavelengths.

However, the color conversion of red and green, and a difference of the blue transmitted light may not render uniform color depending on viewing angles, which may generate the viewing angle problem. The color conversion media layer in red, green, and blue may form a step, which may cause a problem in controlling the liquid crystal.

Also, the visible lights from the fluorescent layer in various directions, and scattered by molecules in the fluorescent layer decreases luminance, resolution, and contrast ratio of the PL-LCD.

SUMMARY OF THE INVENTION

The present invention provides an LCD with a color conversion media, to prevent a change of color uniformity according to viewing angle in a PL-LCD, and to improve luminance and resolution of the PL-LCD.

Additional features of the invention will be set forth in the description which follows, and in part will be apparent from the description, or may be learned by practice of the invention.

The present invention discloses a liquid crystal display including: a first substrate; a thin film transistor arranged on the first substrate; a pixel electrode connected to the thin film transistor; a second substrate facing the first substrate; a light diffusion layer comprising a color conversion media layer and a non-conversion layer arranged on the second substrate; a common electrode arranged on the second substrate; a liquid crystal layer disposed between the first substrate and the second substrate; and a backlight assembly to supply light to the first substrate and the second substrate.

The non-conversion layer may include a transparent polymer and a plurality of openings.

The openings may be smaller than about 40 μm.

The non-conversion layer may include a transparent polymer and a plurality of transparent beads.

The beads may be smaller than about 40 μm.

The backlight assembly may include a blue light emitting diode.

The color conversion media layer may include a red color conversion media layer and a green color conversion media layer.

The red color conversion media layer may include a red phosphor, wherein the red phosphor may include at least one material of (Ca, Sr, Ba)S, (Ca, Sr, Ba)$_2$Si$_5$N$_8$, CaAlSiN$_3$, CaMoO$_4$, and Eu$_2$Si$_5$N$_8$. The green color conversion media layer may include a green phosphor, wherein the green phosphor may include at least one material of yttrium aluminum garnet (YAG), (Ca, Sr, Ba)$_2$SiO$_4$, SrGa$_2$S$_4$, BAM, α-SiAlON, β-SiAlON, Ca$_3$Sc$_2$Si$_3$O$_{12}$, Tb$_3$Al$_5$O$_{12}$, BaSiO$_4$, CaAlSiON, and (Sr$_{1-x}$Ba$_x$)Si$_2$O$_2$N$_2$.

The color conversion media layer may include quantum dots.

The quantum dots may include a first portion and a second portion, the second portion enclosing the first portion, the first portion may include at least one material of an II-IV group semiconductor comprising ZnS, CdSe, or HgTe, an IV-VI group semiconductor comprising PbS, PbSe, or PbTe, and an III-V group semiconductor comprising AlN, GaP, or InAs, and the second portion may include at least one material of an II-IV group semiconductor comprising ZnS, CdSe, or HgTe, an IV-VI group semiconductor comprising PbS, PbSe, or PbTe, and an III-V group semiconductor comprising GaN, GaP, or InAs.

The liquid crystal display further includes a lower polarizer arranged on a rear surface of the first substrate; and an upper polarizer arranged on the second substrate layer.

The upper polarizer may be arranged between the light diffusion layer and the liquid crystal layer. The upper polarizer may be arranged between the light diffusion layer and the second substrate.

The liquid crystal display further includes a passivation layer arranged on the light diffusion layer.

The upper polarizer may include a reflecting polarizer layer reflecting light scattered in the color conversion media layer toward the color conversion media layer.

The reflecting polarizer may include a plurality of wire grids.

The wire grid may be stripe shape.

A period of the wire grid may be less than about 200 nm.

The present invention also discloses a liquid crystal display including: a first substrate; a thin film transistor arranged on the first substrate; a pixel electrode connected to the thin film transistor; a backlight assembly to supply a first light comprising a first wavelength to the first substrate; a second substrate facing the first substrate; a color conversion media layer arranged on the second substrate, the color conversion media layer converts the first light into a second light comprising a second wavelength and scatters the second light; a reflecting polarizer arranged on the color conversion media layer, the reflecting polarizer reflects the second light toward the color conversion media layer; a common electrode arranged on the reflecting polarizer; and a liquid crystal layer disposed between the first substrate and the second substrate.

The reflecting polarizer may comprise a plurality of wire grids.

The wire grid may be stripe shape.

A period of the wire grid may be less than about 200 nm.

The wire grid may include at least one of aluminum (Al), molybdenum (Mo), tantalum (Ta), titanium (Ti), tungsten (W), chromium (Cr) or silver (Ag).

The first light including the first wavelength may be blue light.

The first wavelength may include in the range of about 430 nm~480 nm.

The color conversion media layer may include a red color conversion media layer and a green color conversion media layer.

The liquid crystal display further includes a non-conversion layer disposed between the second substrate and the reflecting polarizer.

The non-conversion layer may include a plurality of openings and a transparent polymer.

The red color conversion media layer may include a red phosphor and the green color conversion media layer may include a green phosphor.

The color conversion media layer may include quantum dots.

The first light including the first wavelength is ultra violet light.

The first wavelength may include in the range of about 200 nm~410 nm.

The color conversion media layer may include a red color conversion media layer, a green color conversion media layer and a blue color conversion media layer.

The liquid crystal display further includes a non-conversion layer disposed between the second substrate and the reflecting polarizer.

The non-conversion layer may include a plurality of openings and a transparent polymer.

The red color conversion media layer may include a red phosphor and the green color conversion media layer may include a green phosphor.

The color conversion media layer may include quantum dots.

The first light including the first wavelength may be ultra violet light.

The first wavelength may include in the range of about 200 nm~410 nm.

The color conversion media layer may include a red color conversion media layer, a green color conversion media layer and a blue color conversion media layer.

The red color conversion media layer may include a red phosphor, the green color conversion media layer may include a green phosphor and the blue color conversion media layer is include a blue phosphor.

The color conversion media layer may include quantum dots.

The upper polarizer may be arranged between the color conversion media layer and the liquid crystal layer. The upper polarizer is arranged between the color conversion media layer and the second substrate.

The liquid crystal display further includes a passivation layer arranged on the color conversion media layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

A liquid crystal display according to the an embodiment of the present invention will be described below with reference to FIG. 1, FIG. 2, and FIG. 3.

Figure 1:
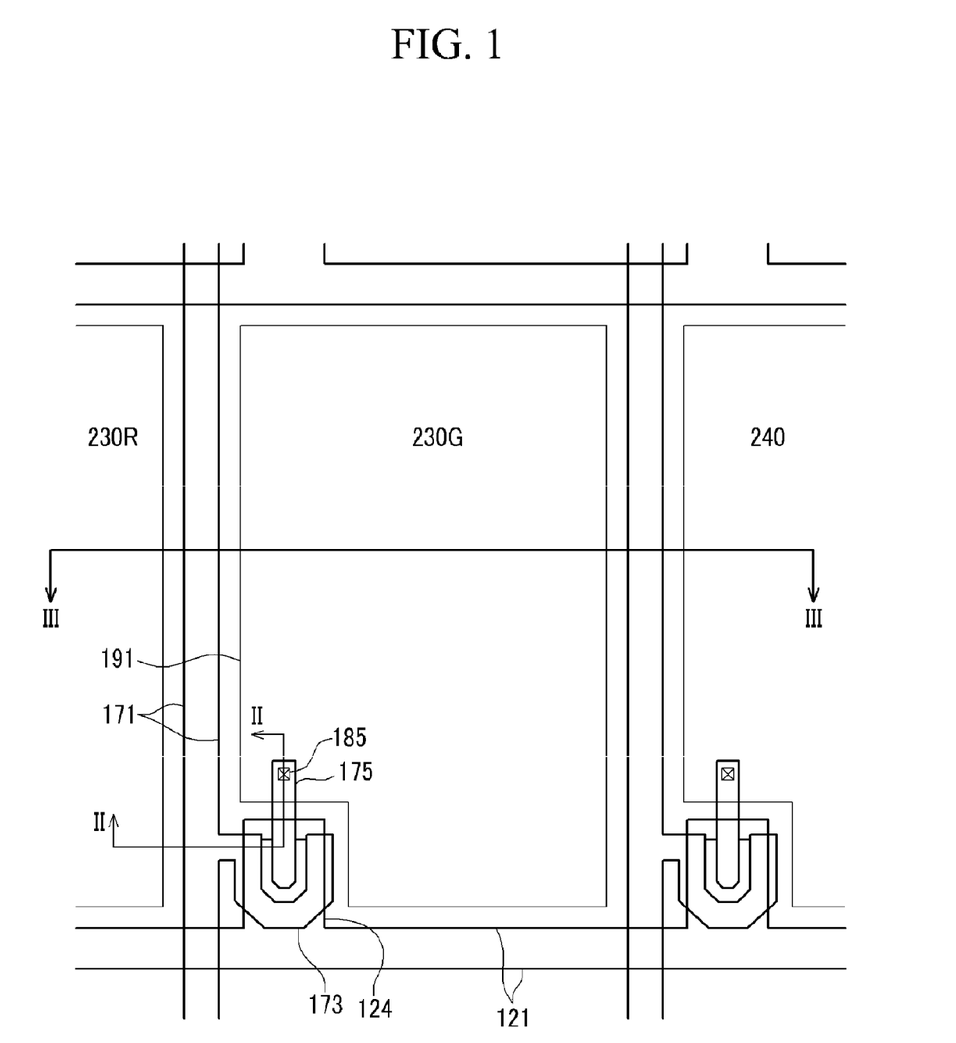
FIG. 1 is a layout view of a liquid crystal display according to an embodiment of the present invention.
Figure 2:
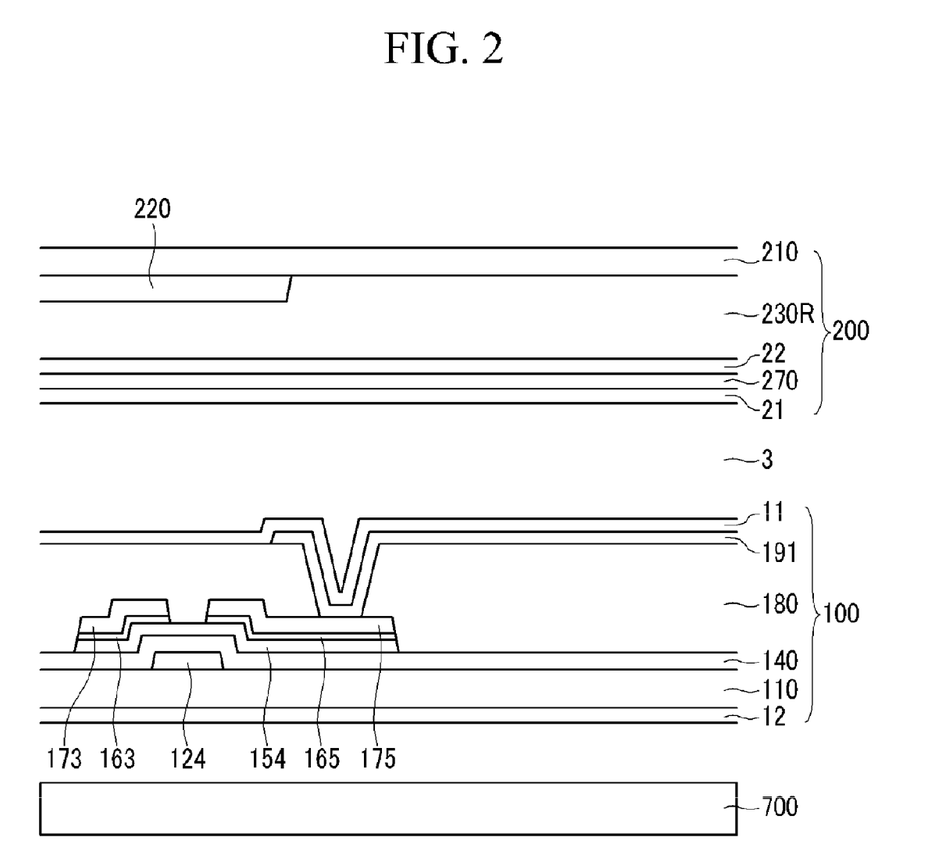
FIG. 2 is a cross-sectional view of the liquid crystal display shown in FIG. 1 taken along the line II-II'.
Figure 3:
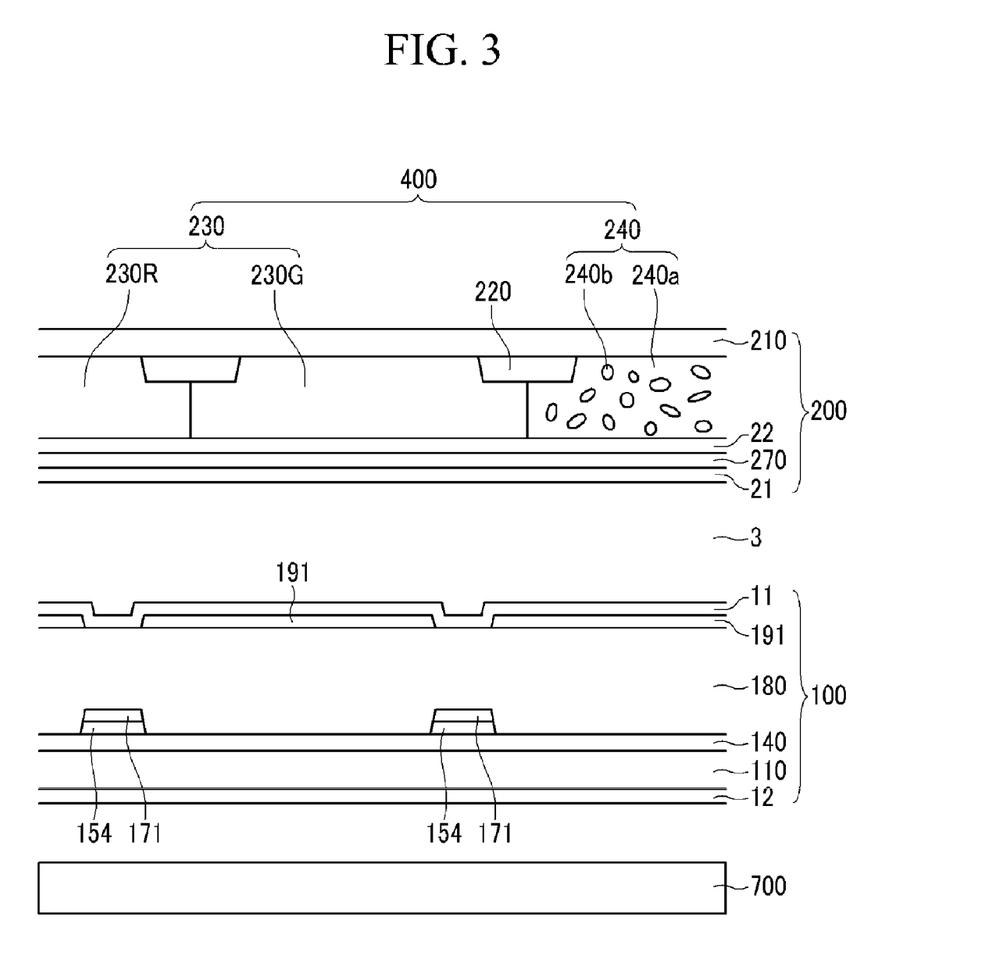
FIG. 3 is a cross-sectional view of the liquid crystal display shown in FIG. 1 taken along the line III-III'.

FIG. 1 is a layout view of a liquid crystal display according to an embodiment of the present invention, FIG. 2 is a cross-sectional view of the liquid crystal display shown in FIG. 1 taken along the line II-II', and FIG. 3 is a cross-sectional view of the liquid crystal display shown in FIG. 1 taken along the line III-III'.

As shown in FIG. 1, FIG. 2, and FIG. 3, a liquid crystal display according to the first exemplary embodiment of the present invention includes a thin film transistor array panel 100 and a common electrode panel 200 facing each other, and a liquid crystal layer 3 interposed between the two display panels 100 and 200. Also, a backlight assembly 700 for supplying light to the two display panels 100 and 200 is included.

The backlight assembly irradiates a blue light and may include a blue light emit diode (LED). A wavelength of the blue light is about 430 μm to 480 μm.

Firstly, the thin film transistor array panel 100 will be described.

The thin film transistor array panel 100 includes a plurality of gate lines 121 formed on a lower substrate 110 made of an insulating material such as glass or plastic. A gate insulating layer 140, a plurality of semiconductors 154, a plurality of ohmic contacts 163 and 165, a plurality of data lines 171 and a plurality of drain electrodes 175 are sequentially formed thereon.

The gate lines 121 transmit gate signals and extend in a transverse direction. Each of the gate lines 121 includes a plurality of gate electrodes 124 protruding upward.

The data lines 171 transmit data signals and extend in a longitudinal direction, thereby crossing the gate lines 121. Each data line 171 includes a plurality of source electrodes 173 extending toward the gate electrodes 124. The drain electrodes 175 are separated from the data lines 171 and are opposite to the source electrodes 173 with respect to the gate electrodes 124.

The semiconductor 154 is disposed on the gate electrode 124 but separated from it by gate insulating layer 140. The ohmic contacts 163 and 165 are disposed between the semiconductor 154, and the data line 171 and drain electrode 175 respectively, thereby reducing resistance therebetween.

A gate electrode 124, a source electrode 173, and a drain electrode 175 form a thin film transistor (TFT) along with the semiconductor 154. A channel of the thin film transistor is formed in the semiconductor 154 between the source electrode 173 and the drain electrode 175.

A passivation layer 180 is formed on the gate insulating layer 140, the data line 171, and the drain electrode 175.

A pixel electrode 191 is formed on the passivation layer 180. The pixel electrode 191 may be made of a transparent conductive material such as indium tin oxide (ITO) or indium zinc oxide (IZO), or a reflective metal such as aluminum or a silver alloy, and is connected to the drain electrode 175 through the contact hole 185.

A lower alignment layer 11 for aligning liquid crystal molecules is formed on the pixel electrode 191, and a lower polarizer 12 is formed on a rear surface of the first substrate 110.

Next, the common electrode panel 200 will be described.

A plurality of light blocking members 220 referred to as a black matrix are formed on an upper substrate 210 made of an insulating material such as glass or plastic.

A light diffusion layer 400 is formed on the upper substrate 210. The diffusion layer 400 includes a color conversion media layer 230 and a non-conversion layer 240.

The color conversion media layer 230 includes a red color conversion media layer 230R and a green color conversion media layer 230G.

The red color conversion media layer 230R converts blue light supplied from the backlight assembly 700 including a blue light emitting diode (LED) into red light. The red color conversion media layer 230R is made of red phosphors, and at least one material of (Ca, Sr, Ba)S, (Ca, Sr, Ba)$_2$Si$_5$N$_8$, CaAlSiN$_3$, CaMoO$_4$, and Eu$_2$Si$_5$N$_8$ may be used as the red phosphors.

The green color conversion media layer 230G converts the blue light supplied from the backlight assembly 700 including a blue light emitting diode (LED) into green light. The green color conversion media layer 230G is made of green phosphors, and at least one material of yttrium aluminum garnet (YAG), (Ca, Sr, Ba)$_2$SiO$_4$, SrGa$_2$S$_4$, BAM, α-SiAlON, β-SiAlON, Ca$_3$Sc$_2$Si$_3$O$_{12}$, Tb$_3$Al$_5$O$_{12}$, BaSiO$_4$, CaAlSiON, and (Sr$_{1-x}$Ba$_x$)Si$_2$O$_2$N$_2$ may be used as the green phosphors.

Also, the red color conversion media layer 230R and the green color conversion media layer 230G may be made of quantum dots of which the color is changed according to the size.

The quantum dots include a core and a shell enclosing the core, and the core is made of at least one material of a II-IV group semiconductor including ZnS, ZnSe, ZnTe, CdS, CdSe, CdTe, HgS, HgSe, or HgTe, a IV-VI group semiconductor including PbS, PbSe, or PbTe, and a III-V group semiconductor including AlN, AlP, AlAs, AlSb, GaN, GaP, GaAs, GaSb, InN, InP, InAs, or InSb.

Also, the shell is made of at least one material of a II-IV group semiconductor including ZnS, ZnSe, ZnTe, CdS, CdSe, CdTe, HgS, HgSe, or HgTe, a IV-VI group semiconductor including PbS, PbSe, or PbTe, and a III-V group semiconductor including GaN, GaP, GaAs, GaSb, InN, InP, InAs, or InSb.

The non-conversion layer 240 transmits blue light supplied from the backlight assembly 700 including a blue light emitting diode (LED). The non-conversion layer is made of a transparent polymer 240a including a plurality of openings 240b. The size of the openings 240b may be less than 40 μm. The blue light supplied from the backlight assembly 700 including a blue light emitting diode (LED) is diffused by the openings 240b of the non-conversion layer 240.

Also, the non-conversion layer 240 may be made of a transparent polymer including beads (not shown) instead of the openings 240b. Here, the size of the beads may be also less than 40 μm.

As described above, the red color conversion media layer 230R and the green color conversion media layer 230G reduces the light loss, by using phosphors that generate red light and green light. This may cause light density difference between red and green lights and blue light. Thus, the non-conversion layer 240 includes the transparent polymer 240a and the openings (or the beads—not shown) 240b to reduce or eliminate the step between the red color conversion media layer 230R and the green color conversion media layer 230G, and the non-conversion layer 240. Further, such non-conversion layer 240 diffuses the blue light as directly transmitted from the blue LED and thereby may solve the viewing angle problem.

An upper polarizer 22 is formed on the red color conversion media layer 230R, the green color conversion media layer 230G, and the non-conversion layer 240.

A common electrode 270 is formed on the upper polarizer 22, and an upper alignment layer 21 is formed on the common electrode 270.

Next, how to manufacture the common electrode panel 200 according to an embodiment of the present invention will be described with reference to FIG. 4, FIG. 5, FIG. 6, FIG. 7, and FIG. 8.

FIG. 4, FIG. 5, FIG. 6, FIG. 7, and FIG. 8 are cross-sectional views sequentially showing manufacturing steps of a common electrode panel according to an embodiment of the present invention.

Figure 4:
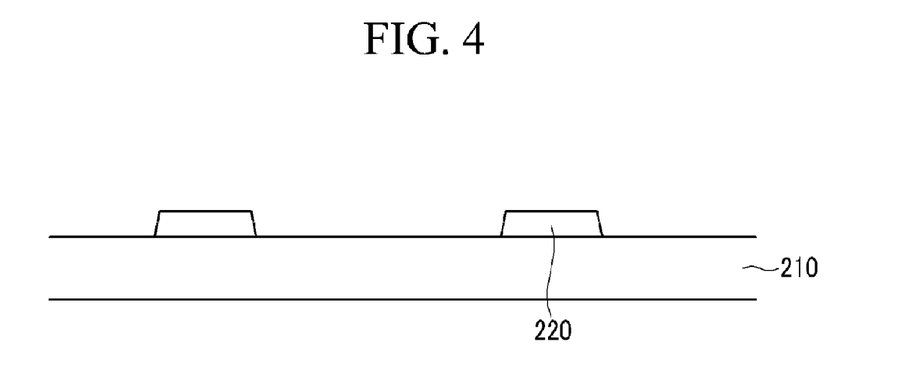
FIG. 4, FIG. 5, FIG. 6, FIG. 7, and FIG. 8 are cross-sectional views sequentially showing a manufacturing method of a common electrode panel according to an embodiment of the present invention.

First, as shown in FIG. 4, a light blocking member 220 is formed on the insulation substrate 210.

Figure 5:
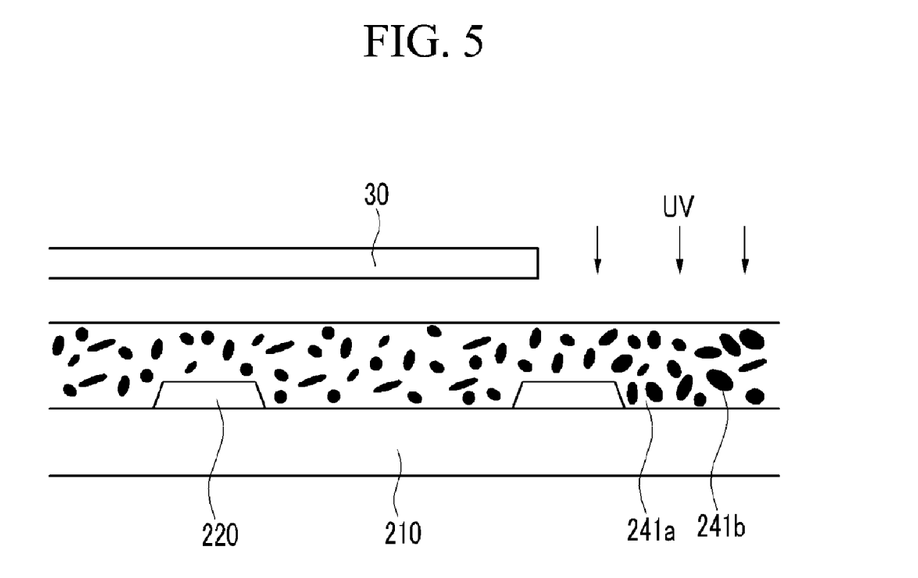

Next, as shown in FIG. 5, a mixed material including a plurality of photosensitive film resin particles 241b and a transparent polymer 241a is coated on a substrate 210, and ultraviolet rays are irradiated on only a blue pixel portion by using a mask 30 covering red and green pixel portions to harden the mixed material of the photosensitive film resin particles 241a and the transparent polymer 241a. Here, the size of the photosensitive film resin particles 241b may be less than 40 μm.

Figure 6:
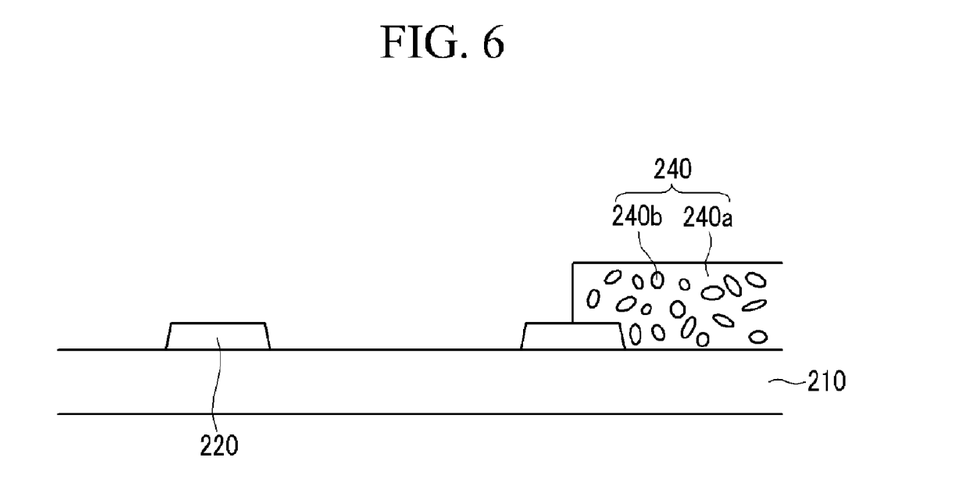

Next, as shown in FIG. 6, the mixed material of the photosensitive film resin particles 241b and the transparent polymer 241a corresponding to the red and green pixel portions is developed and removed. The non-conversion layer 240 is completed to have transparent polymer 240a with a plurality of openings 240b, by melting the photosensitive film resin particles 241b with a solvent to form a plurality of openings 240b.

Alternatively, a mixed material including a plurality of transparent beads with a size of less than 40 μm and a transparent polymer may be coated to form the non-conversion layer 240, and ultraviolet rays are irradiated only to the blue pixel portion by using a mask 30 covering the red and green pixel portions to harden the mixed material of the transparent beads and the transparent polymer 240a of the blue pixel portions. Next, the mixed material of the transparent beads and the transparent polymer 240a corresponding to the red and green pixels is developed and removed.

Figure 7:
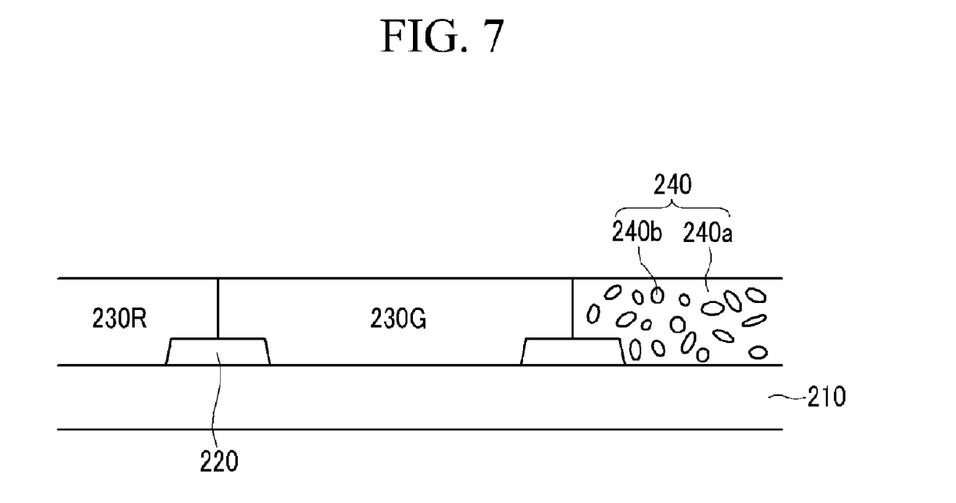

Then, as shown in FIG. 7, a red color conversion media layer 230R and a green color conversion media layer 230G are formed. The red color conversion media layer 230R may include at least one material of (Ca, Sr, Ba)S, (Ca, Sr, Ba)$_2$Si$_5$N$_8$, CaAlSiN$_3$, CaMoO$_4$, or Eu$_2$Si$_5$N$_8$, and the green color conversion media layer 230G may include at least one material of yttrium aluminum garnet (YAG), (Ca, Sr, Ba)$_2$SiO$_4$, SrGa$_2$S$_4$, BAM, α-SiAlON, β-SiAlON, Ca$_3$Sc$_2$Si$_3$O$_{12}$, Tb$_3$Al$_5$O$_{12}$, BaSiO$_4$, CaAlSiON, or (Sr$_{1-x}$Ba$_x$)Si$_2$O$_2$N$_2$.

Also, the red color conversion media layer 230R and the green color conversion media layer 230G may include quantum dots of which the color is changed according to the size.

The quantum dots include a core and a shell enclosing the core, and the core is made of at least one material of an II-IV group semiconductor including ZnS, ZnSe, ZnTe, CdS, CdSe, CdTe, HgS, HgSe, or HgTe, an IV-VI group semiconductor including PbS, PbSe, or PbTe, and an III-V group semiconductor including AlN, AlP, AlAs, AlSb, GaN, GaP, GaAs, GaSb, InN, InP, InAs, or InSb.

Also, the shell is made of at least one material of an II-IV group semiconductor including ZnS, ZnSe, ZnTe, CdS, CdSe, CdTe, HgS, HgSe, or HgTe, an IV-VI group semiconductor including PbS, PbSe, or PbTe, and an III-V group semiconductor including GaN, GaP, GaAs, GaSb, InN, InP, InAs, or InSb.

Figure 8:
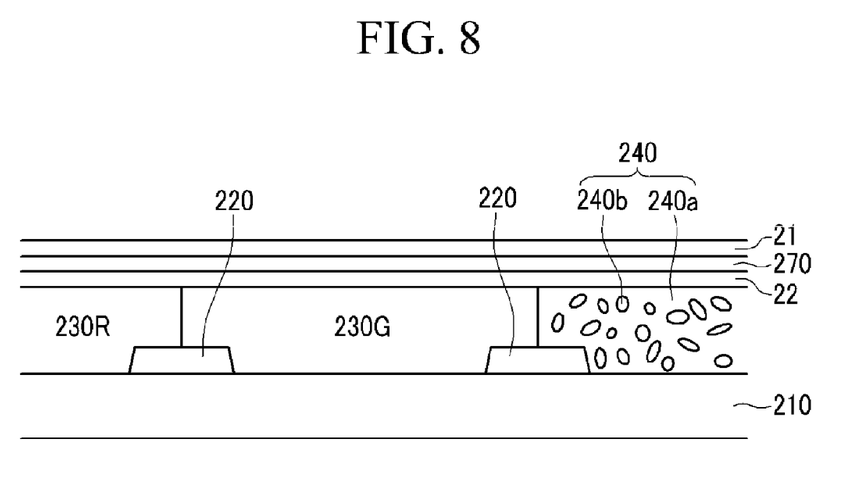

Next, as shown in FIG. 8, an upper polarizer 22, a common electrode 270, and an upper alignment layer 21 are sequentially formed on the red color conversion media layer 230R, the green color conversion media layer 230G, and the non-conversion layer 240.

A liquid crystal display according to another embodiment of the present invention will be described with reference to FIG. 9.

Figure 9:
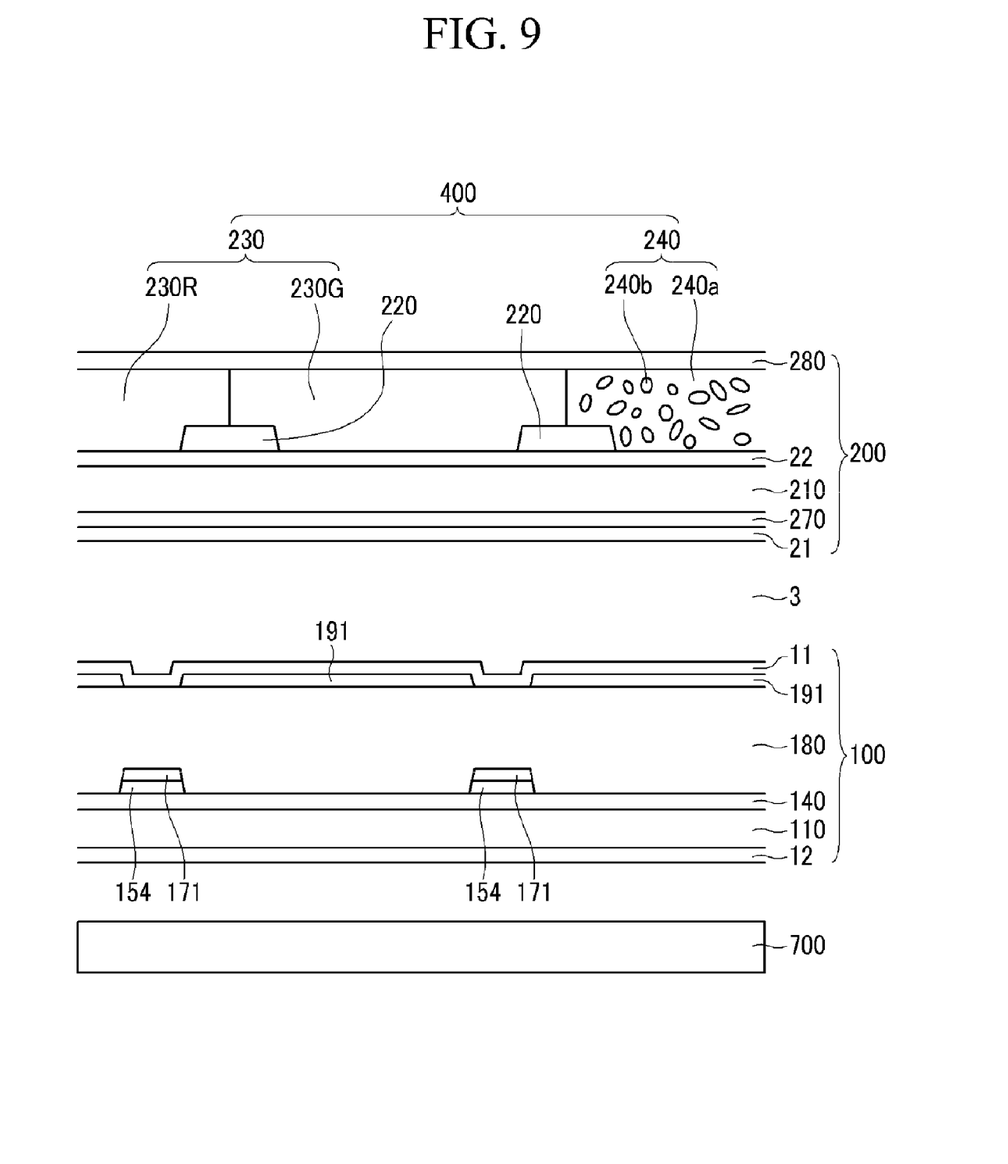
FIG. 9 is a cross-sectional view of a liquid crystal display according to another embodiment of the present invention.

FIG. 9 is a cross-sectional view of a liquid crystal display according to another embodiment of the present invention.

As shown in FIG. 9, a common electrode 270 is formed on an insulation substrate 210, and an upper alignment layer 21 is formed on the common electrode 270.

An upper polarizer 22 is formed on the rear surface of the insulation substrate 210, and a light blocking member 220 is formed on the upper polarizer 22. A diffusion layer 400 is formed on the upper polarizer 22 and the light blocking member 220. The diffusion layer 400 includes a color conversion media layer 230 and a non-conversion layer 240.

The color conversion media layer 230 includes a red color conversion media layer 230R, and a green color conversion media layer 230G.

A second passivation layer 280 for protecting the color conversion media layer 230 and the non-conversion layer 240 is formed on the color conversion media layer 230 and the non-conversion layer 240.

A liquid crystal display according to another embodiment of the present invention will be described with reference to FIG. 10 and FIG. 11.

Figure 10:
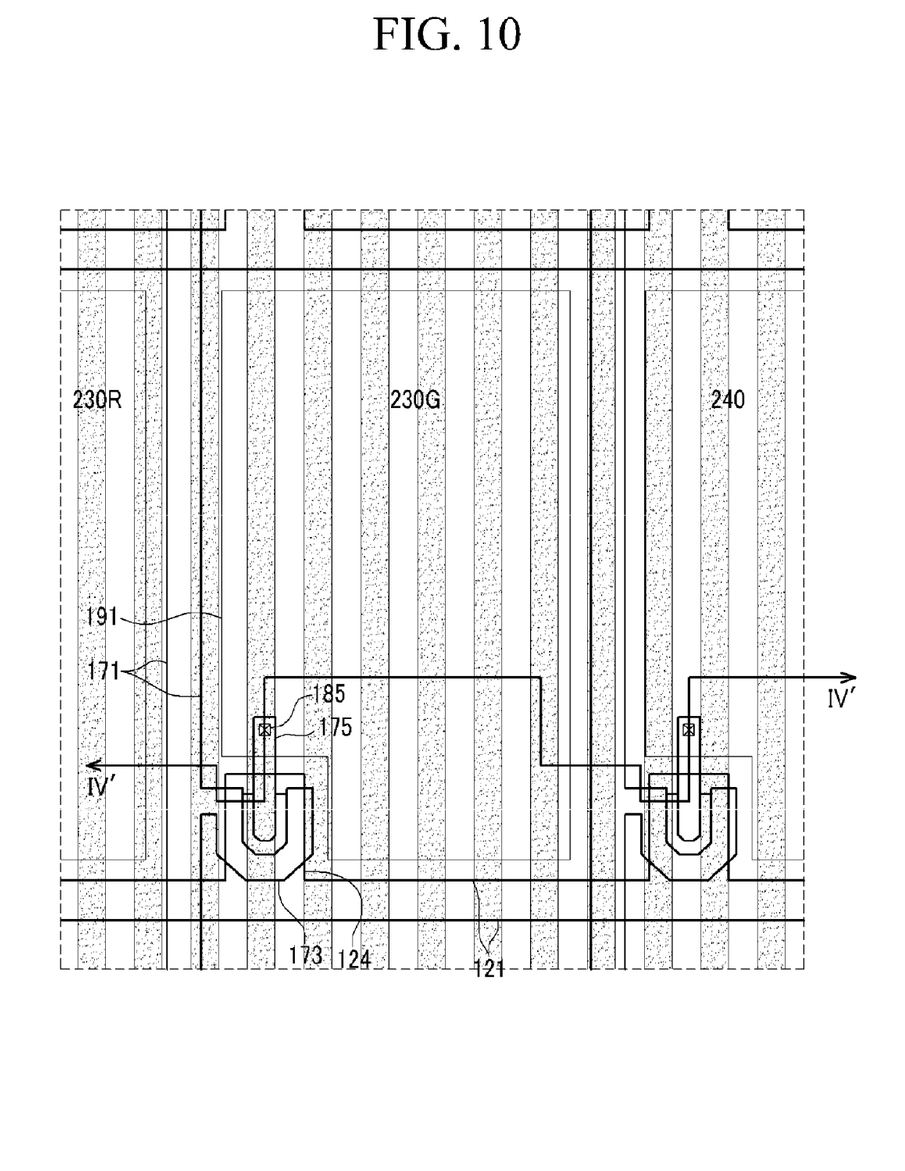
FIG. 10 is a layout view of a liquid crystal display according to another embodiment of the present invention.
Figure 11:
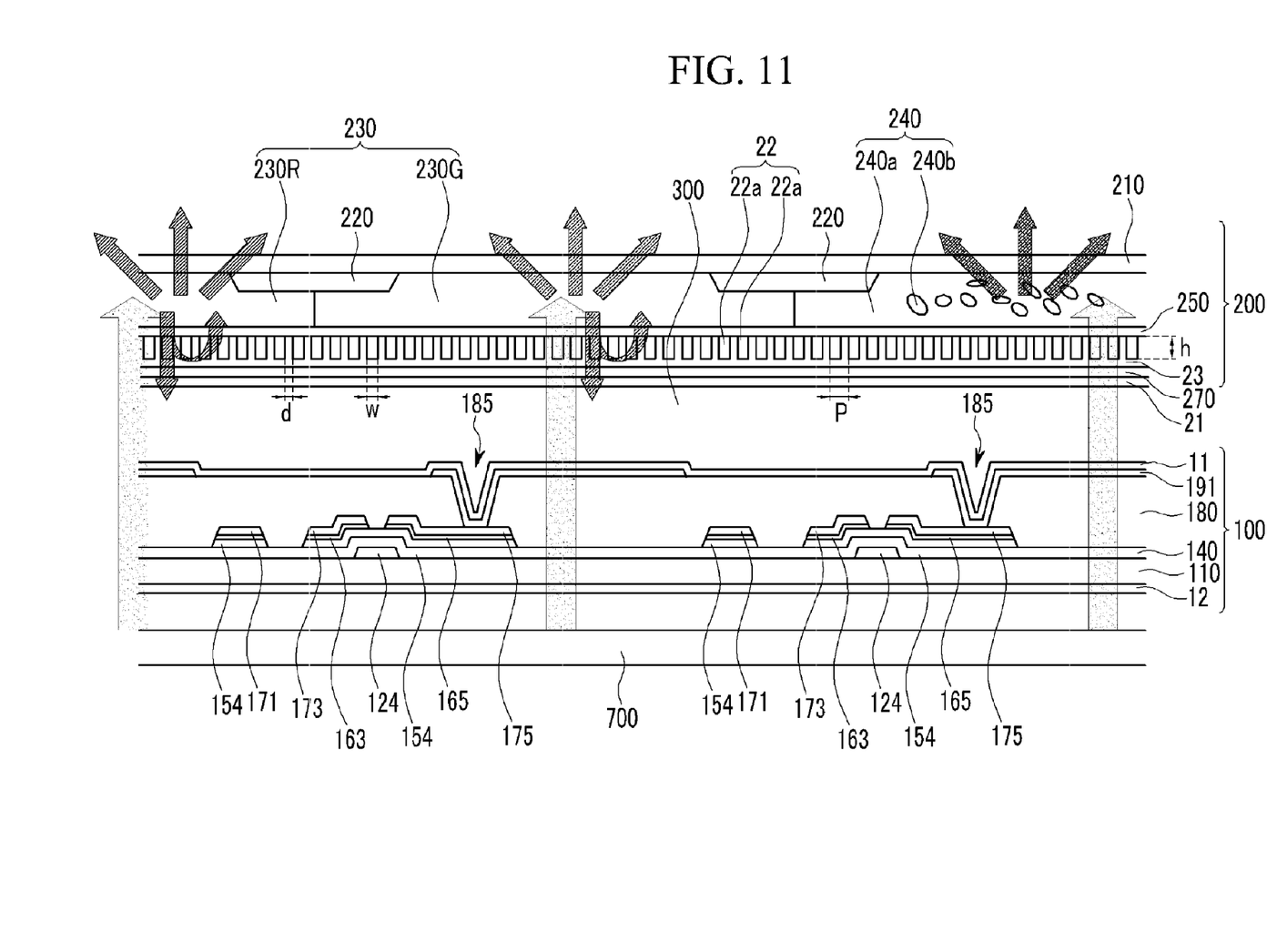
FIG. 11 is a cross-sectional view of the liquid crystal display shown in FIG. 10 taken along the line IV-IV'.

FIG. 10 is a layout view of a liquid crystal display according to another embodiment of the present invention, FIG. 11 is a cross-sectional view of the liquid crystal display shown in FIG. 10 taken along the line IV-IV'.

As shown in FIG. 10 and FIG. 11, a liquid crystal display according to another embodiment of the present invention includes a thin film transistor array panel 100, a common electrode panel 200 facing each other, a liquid crystal layer 3 interposed between the two display panels 100 and 200, and a backlight assembly 700 for supplying light to the two display panels 100 and 200. Also, the common electrode panel 200 includes a reflecting polarizer 22 including the plurality of wire gird 22a.

The backlight assembly irradiates a blue light and may include a blue light emit diode (LED). A wavelength of the blue light is about 430 μm to about 480 μm.

First, the common electrode panel 200 will be described.

A plurality of light blocking members 220 referred to as a black matrix are formed on an upper substrate 210 made of an insulating material such as glass or plastic.

A color conversion media layer 230 including a red color conversion media layer 230R and a green color conversion media layer 230G is formed on the upper substrate 210, and a non-conversion layer 240 are formed on the upper substrate 210.

The backlight assembly 700 includes a blue light emitting diode (LED) and provided blue lights with a wavelength of about 430 μm to 480 μm. The red color conversion media layer 230R converts the blue light from the backlight assembly 700 into red light. The red color conversion media layer 230R is made of red phosphors. The red phosphors may include at least one material of (Ca, Sr, Ba)S, (Ca, Sr, Ba)$_2$Si$_5$N$_8$, CaAlSiN$_3$, CaMoO$_4$, and Eu$_2$Si$_5$N$_8$.

The green color conversion media layer 230G converts the blue light from the backlight assembly 700 into green light. The green color conversion media layer 230G is made of green phosphors. The green phosphors may include at least one material of yttrium aluminum garnet (YAG), (Ca, Sr, Ba)$_2$SiO$_4$, SrGa$_2$S$_4$, BAM, α-SiAlON, β-SiAlON, Ca$_3$Sc$_2$Si$_3$O$_{12}$, Tb$_3$Al$_5$O$_{12}$, BaSiO$_4$, CaAlSiON, and (Sr$_{1-x}$Ba$_x$)Si$_2$O$_2$N$_2$.

Also, the red color conversion media layer 230R and the green color conversion media layer 230G may be made of quantum dots of which the color may change according to its size.

The quantum dots include a core and a shell enclosing the core, and the core is made of at least one material of a II-IV group semiconductor including ZnS, ZnSe, ZnTe, CdS, CdSe, CdTe, HgS, HgSe, or HgTe, a IV-VI group semiconductor including PbS, PbSe, or PbTe, and a III-V group semiconductor including AlN, AlP, AlAs, AlSb, GaN, GaP, GaAs, GaSb, InN, InP, InAs, or InSb.

Also, the shell is made of at least one material of a II-IV group semiconductor including ZnS, ZnSe, ZnTe, CdS, CdSe, CdTe, HgS, HgSe, or HgTe, a IV-VI group semiconductor including PbS, PbSe, or PbTe, and a III-V group semiconductor including GaN, GaP, GaAs, GaSb, InN, InP, InAs, or InSb.

A visible light including the red light or the green light generated from the color conversion media layer 230 is scattered in various directions, and a portion of the visible light is irradiated onto the backlight assembly 700.

The non-conversion layer 240 is made of a transparent polymer 240a including a plurality of openings 240b. The openings 240b may be smaller than 40 μm. The blue light from the backlight assembly 700 is diffused by the openings 240b of the non-conversion layer 240.

Also, the non-conversion layer 240 may be made of a transparent polymer 240a including beads (not shown) instead of the openings 240b. Here, the beads may be also smaller than 40 μm in diameter.

Also, the non-conversion layer 240 may only include a transparent polymer 240a and none of openings 240b. Also, the non-conversion layer 240 may not be included.

Next, a planar layer 250 is formed on the color conversion media layer 230 and the non-conversion layer 240.

The planar layer 250 may provide a flat surface for a step formed on the color conversion layer 230 and the non-conversion layer 240. The planar layer 250 may include one of acryl resin, polyamide resin or polycarbonate resin. Also, the planar layer may be omitted.

A reflecting polarizer 22 is formed on the planar layer 250.

The reflecting polarizer 22 may include a plurality of wire grids 22a. Here, The wire grid 22a is stripe shape and is made of a conductive metal, for example, aluminum (Al), molybdenum (Mo), tantalum (Ta), titanium (Ti), tungsten (W), chromium (Cr) and silver (Ag).

The plurality of wire grid 22a include an interval (d), a width (w), a height (h) and a period (P). The period (P) of the wire grid 22a is a sum of the interval (d) and the width (w) of the wire grid 22a. The period (P) of the wire grid 22a is smaller than a wavelength of an incident light. The period (P) of the wire grid 22a may be less than about 200 nm and the height of the wire grid 22a may be not less than about 100 nm. The interval (d), the width (w), the height (h) and the period (P) may be formed in a various size or shape according to optical characteristics demanded in certain PL-LCDs.

An insulating layer 23 is formed on the reflecting polarizer 22.

The insulating layer 23 covers the reflecting polarizer 22 and provides a flat surface. The insulating layer 23 may include one of acryl resin, polyamide resin or polycarbonate resin.

A common electrode 270 is formed on insulating layer 23, and an upper alignment layer 21 is formed on the common electrode 270.

Next, a light path supplied from the backlight assembly 700 and scattered in the color conversion media layer 230 will be described below with reference to FIG. 11.

The light supplied from the backlight assembly 700 is polarized by the lower polarizer 12 and enters into a rear surface of the thin film transistor array panel 100. A direction of the polarized light through the pixel electrode 191 is controlled by the liquid crystal layer 3.

The polarized light through the liquid crystal layer 3 enters into the reflecting polarizer 22. Here, a polarized direction of light through the reflecting polarizer 22 corresponds to a polarized direction of the light through the liquid crystal layer 3. The polarized light through the reflecting polarizer 22 enters into the color conversion media layer 230 and is converted into a visible light, and is scattered in various directions. A portion of the visible light enters into the upper substrate 210 and a portion of the visible light enters into the backlight assembly 700. Also, the visible light scattered into the color conversion media layer does not include the polarized light.

The reflecting polarizer 22 reflects a portion of the visible light entering to the backlight assembly 700 toward the color conversion media layer 230. For example, when the reflecting polarizer 22 includes the plurality of wire gird 22a the reflecting polarizer 22 may reflect S wave toward the color conversion media layer 230. Therefore, the reflecting polarizer 22 improves light efficiency.

Also, a blue light entered to the non-conversion layer 240 through the reflecting polaraizer 22 is diffused by the openings 240b and passes the upper substrate 210.

Next, a manufacturing method of the common electrode panel 200 according to the another embodiment of the present invention will be described with reference to FIG. 12, FIG. 13, FIG. 14, and FIG. 15.

FIG. 12, FIG. 13, FIG. 14, and FIG. 15. are cross-sectional views sequentially showing manufacturing steps of a common electrode panel according to another embodiment of the present invention.

Figure 12:
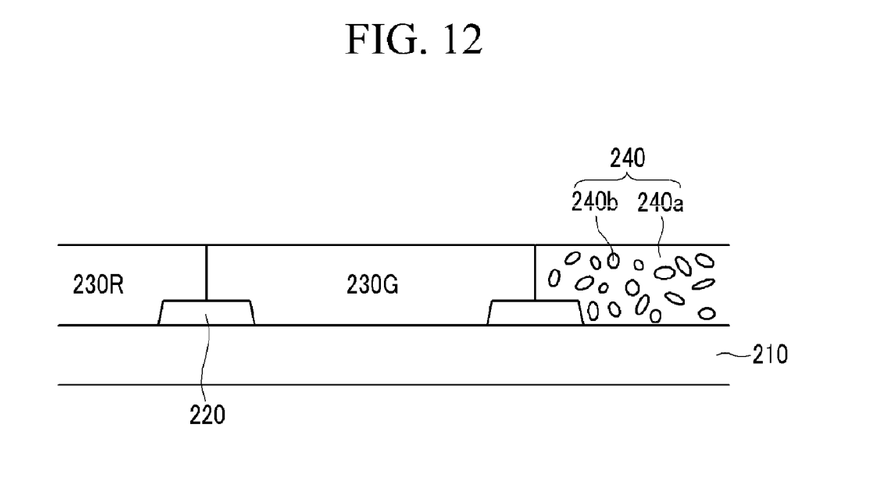
FIG. 12, FIG. 13, FIG. 14, and FIG. 15 are cross-sectional views sequentially showing a manufacturing method of a common electrode panel according to another embodiment of the present invention.

First, as shown in FIG. 12, a light blocking member 220, a red color conversion media layer 230R, a green color conversion media layer 240G and a non-conversion layer 240 are formed on the insulation substrate 210.

Figure 13:
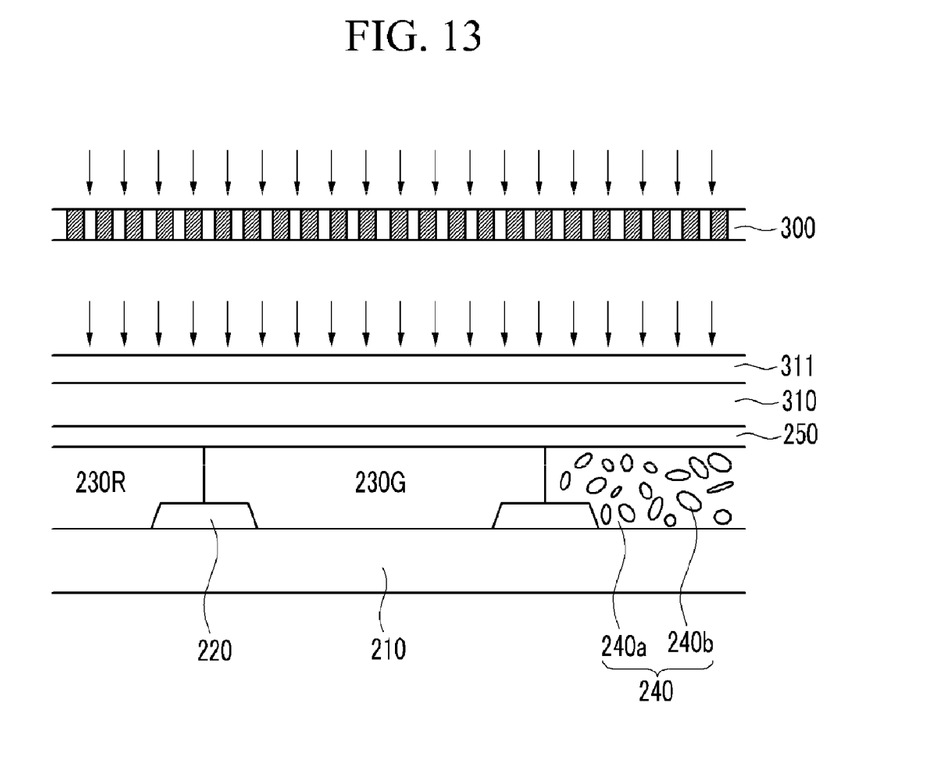

Next, as shown in FIG. 13, a planar layer 250 is formed on the red color conversion media layer 230R, the green color conversion media layer 240G and the non-conversion layer 240. Also, a conductive metal layer 310 is formed on the planar layer 250. The conductive metal layer 310 may include one of aluminum (Al), molybdenum (Mo), tantalum (Ta), titanium (Ti), tungsten (W), chromium (Cr) or silver (Ag).

Next, a photo-resist layer 311 is formed on the conductive metal layer 310. The photo-resist layer 311 is exposed through a mask 300 including a pattern corresponding to a plurality of wire grids 22a.

Figure 14:
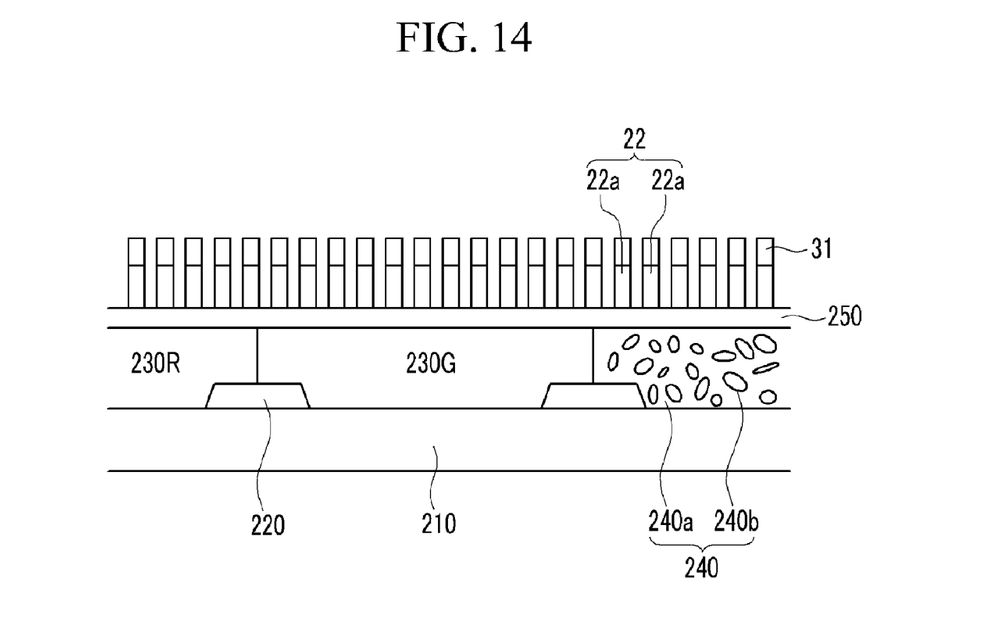

Next, as shown in FIG. 14, a photo-resist pattern 31 is formed by developing the exposed photo-resist layer 311. The plurality of wire grids 22a is formed by etching the photo-resist pattern 31.

Figure 15:
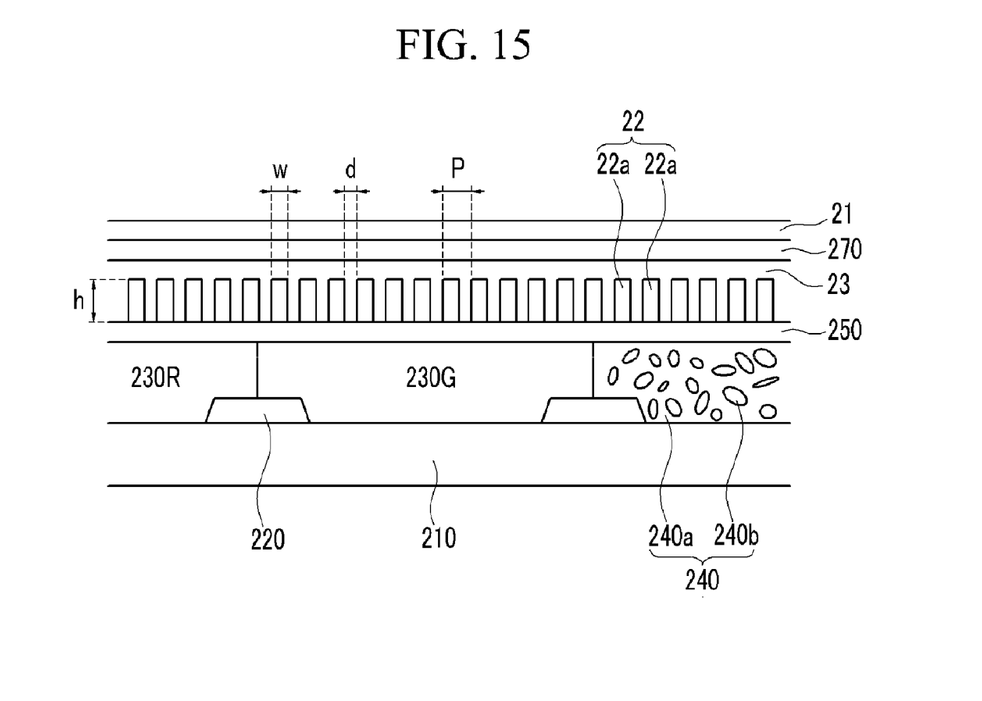

Next, as shown in FIG. 15, after removing remaining photo-resist pattern 31, an insulation layer 23, a common electrode 270 and a upper alignment layer 21 is formed sequentially.

The period (P) of the wire grid 22a may be less than about 200 nm. Also, the wire grid 22a according to another embodiment of the present invention is stripe shape. However, the reflecting layer 22 may be formed in a various size or shape.

Next, a liquid crystal display according to another embodiment of the present invention will be described with reference to FIG. 16.

Figure 16:
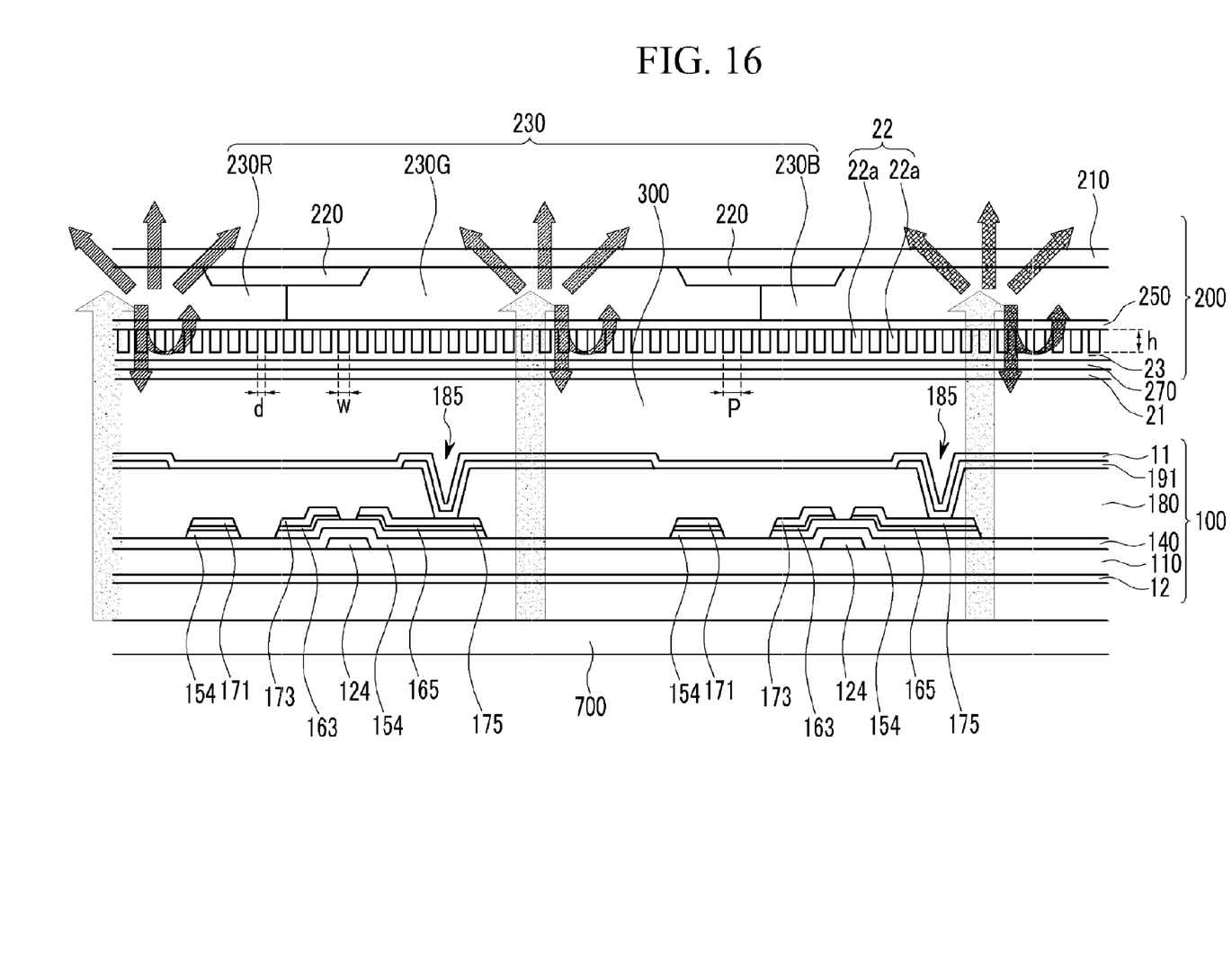
FIG. 16 is a cross-sectional view of the liquid crystal display shown in FIG. 10 taken along the line IV-IV'.

FIG. 16 is a cross-sectional view of the liquid crystal display shown in FIG. 10 taken along the line IV-IV'.

As shown in FIG. 10 and FIG. 16, a liquid crystal display according to another embodiment of the present invention includes a thin film transistor array panel 100, a common electrode panel 200 facing each other, a liquid crystal layer 3 interposed between the two display panels 100 and 200 and a backlight assembly 700 for supplying light to the two display panels 100 and 200.

The backlight assembly 700 according to another embodiment of the present invention irradiates an ultra violet (UV) light. The wavelength of the UV light may range from about 200 nm to about 410 nm. Also, the backlight assembly 700 may irradiate a near UV light. The wavelength of the near UV light may range from about 380 nm to about 410 nm.

The period (P) of the wire grid 22a needs to be smaller than a wavelength of an incident light. The period (P) of the wire grid 22a may be less than about 200 nm.

Also, a color conversion media layer 230 of a liquid crystal display according to another embodiment of the present invention further includes a blue color conversion media layer 230B.

The blue color conversion media layer 230B converts UV light from the backlight assembly 700 into blue light. The blue color conversion media layer 230B is made blue phosphors, and 3(Ba, Mg, Eu, Mn)O.8 Al2O3 may be used as the blue. The red color conversion media layer 230R is made of red phosphors, and at least one material of (Ca, Sr, Ba)S, (Ca, Sr, Ba)$_2$Si$_5$N$_8$, CaAlSiN$_3$, CaMoO$_4$, and Eu$_2$Si$_5$N$_8$ may be used as the red phosphors. The green color conversion media layer 230G is made of green phosphors, and at least one material of yttrium aluminum garnet (YAG), (Ca, Sr, Ba)$_2$SiO$_4$, SrGa$_2$S$_4$, BAM, α-SiAlON, β-SiAlON, Ca$_3$Sc$_2$Si$_3$O$_{12}$, Tb$_3$Al$_5$O$_{12}$, BaSiO$_4$, CaAlSiON, and (Sr$_{1-x}$Ba$_x$)Si$_2$O$_2$N$_2$ may be used as the green phosphors.

Also, the blue color conversion media layer 230B may be made of quantum dots of which the color is changed according to the size.

The quantum dots include a core and a shell enclosing the core, and the core is made of at least one material of a II-IV group semiconductor including ZnS, ZnSe, ZnTe, CdS, CdSe, CdTe, HgS, HgSe, or HgTe, a IV-VI group semiconductor including PbS, PbSe, or PbTe, and a III-V group semiconductor including AlN, AlP, AlAs, AlSb, GaN, GaP, GaAs, GaSb, InN, InP, InAs, or InSb.

Also, the shell is made of at least one material of a II-IV group semiconductor including ZnS, ZnSe, ZnTe, CdS, CdSe, CdTe, HgS, HgSe, or HgTe, a IV-VI group semiconductor including PbS, PbSe, or PbTe, and a III-V group semiconductor including GaN, GaP, GaAs, GaSb, InN, InP, InAs, or InSb.

The reflecting polarizer 22 transmits the UV light through a lower polarizer 12 and a liquid crystal layer 300. The UV light through the reflecting polarizer 22 is converted and scattered into a visible light in a red color conversion media layer 230R, a green color conversion media layer 230G and the blue green color conversion media layer 230B.

The reflecting polarizer 22 reflects toward the color conversion media layer 230 a portion of the visible light entering back to the backlight assembly 700. Therefore, the reflecting polarizer 22 improves light efficiency.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
a first substrate;
a thin film transistor arranged on the first substrate;
a pixel electrode connected to the thin film transistor;
a second substrate facing the first substrate;
a light diffusion layer comprising a color conversion media layer and a non-conversion layer arranged on the second substrate;
a common electrode arranged on the second substrate;
a liquid crystal layer disposed between the first substrate and the second substrate; and a backlight assembly to supply light to the first substrate and the second substrate.

2. The liquid crystal display of claim 1, wherein the non-conversion layer comprises a transparent polymer and a plurality of openings.

3. The liquid crystal display of claim 2, wherein the plurality of openings are smaller than about 40 μm.

4. The liquid crystal display of claim 1, wherein the non-conversion layer comprises a transparent polymer and a plurality of transparent beads.

5. The liquid crystal display of claim 4, wherein the plurality of transparent beads are smaller than about 40 μm.

6. The liquid crystal display of claim 1, wherein the backlight assembly comprises a blue light emitting diode.

7. The liquid crystal display of claim 6, wherein the color conversion media layer comprises a red color conversion media layer and a green color conversion media layer.

8. The liquid crystal display of claim 7, wherein the red color conversion media layer comprises a red phosphor,
wherein the red phosphor comprises at least one material of (Ca, Sr, Ba)S, (Ca, Sr, Ba)$_2$Si$_5$N$_8$, CaAlSiN$_3$, CaMoO$_4$, and Eu$_2$Si$_5$N$_8$, and
wherein the green color conversion media layer comprises a green phosphor,
wherein the green phosphor comprises at least one material of yttrium aluminum garnet (YAG), (Ca, Sr, Ba)$_2$SiO$_4$, SrGa$_2$S$_4$, BAM, α-SiAlON, β-SiAlON, Ca$_3$Sc$_2$Si$_3$O$_{12}$, Tb$_3$Al$_5$O$_{12}$, BaSiO$_4$, CaAlSiON, and (Sr$_{1-x}$Ba$_x$)Si$_2$O$_2$N$_2$.

9. The liquid crystal display of claim 1, wherein the color conversion media layer comprises quantum dots.

10. The liquid crystal display of claim 9, wherein
the quantum dots comprise a first portion and a second portion, the second portion enclosing the first portion,
the first portion comprises at least one material of an II-IV group semiconductor comprising ZnS, CdSe, or HgTe, an IV-VI group semiconductor comprising PbS, PbSe, or PbTe, and an III-V group semiconductor comprising AlN, GaP, or InAs, and
the second portion comprises at least one material of an II-IV group semiconductor comprising ZnS, CdSe, or HgTe, an IV-VI group semiconductor comprising PbS, PbSe, or PbTe, and an III-V group semiconductor comprising GaN, GaP, or InAs.

11. The liquid crystal display of claim 1, further comprising:
a lower polarizer arranged on a rear surface of the first substrate; and
an upper polarizer arranged on the second substrate.

12. The liquid crystal display of claim 11, wherein the upper polarizer is arranged between the light diffusion layer and the liquid crystal layer.

13. The liquid crystal display of claim 12, wherein the upper polarizer is arranged between the light diffusion layer and the second substrate.

14. The liquid crystal display of claim 13, further comprising a passivation layer arranged on the light diffusion layer.

15. The liquid crystal display of claim 11, wherein the upper polarizer comprises a reflecting polarizer layer reflecting light scattered in the color conversion media layer toward the color conversion media layer.

16. The liquid crystal display of claim 15, wherein the reflecting polarizer comprises a plurality of wire grids.

17. The liquid crystal display of claim 16, wherein the plurality of wire grids have a stripe shape.

18. The liquid crystal display of claim 17, wherein a period of the wire grid is less than about 200 nm.

19. A liquid crystal display, comprising:
a first substrate;
a thin film transistor arranged on the first substrate;
a pixel electrode connected to the thin film transistor;
a backlight assembly to supply a first light comprising a first wavelength to the first substrate;
a second substrate facing the first substrate;
a color conversion media layer arranged on the second substrate, the color conversion media layer converts the first light into a second light comprising a second wavelength and scatters the second light;
a reflecting polarizer arranged on the color conversion media layer, the reflecting polarizer reflects the second light toward the color conversion media layer;
a common electrode arranged on the reflecting polarizer; and
a liquid crystal layer disposed between the first substrate and the second substrate.

20. The liquid crystal display of claim 19, wherein the reflecting polarizer comprises a plurality of wire grids.

21. The liquid crystal display of claim 20, wherein the wire grid is stripe shape.

22. The liquid crystal display of claim 21, wherein a period of the wire grid is less than about 200 nm.

23. The liquid crystal display of claim 21, wherein the wire grid comprises at least one of aluminum (Al), molybdenum (Mo), tantalum (Ta), titanium (Ti), tungsten (W), chromium (Cr) or silver (Ag).

24. The liquid crystal display of claim 19, wherein the first light comprising the first wavelength is blue light.

25. The liquid crystal display of claim 24, wherein the first wavelength comprises in the range of about 430 nm~480 nm.

26. The liquid crystal display of claim 24, wherein the color conversion media layer comprises a red color conversion media layer and a green color conversion media layer.

27. The liquid crystal display of claim 26, further comprising a non-conversion layer disposed between the second substrate and the reflecting polarizer.

28. The liquid crystal display of claim 27, wherein the non-conversion layer comprise a plurality of openings and a transparent polymer.

29. The liquid crystal display of claim 26, wherein the red color conversion media layer comprises a red phosphor and the green color conversion media layer comprises a green phosphor.

30. The liquid crystal display of claim 24, wherein the color conversion media layer comprises quantum dots.

31. The liquid crystal display of claim 19, wherein the first light comprising the first wavelength is ultra violet light.

32. The liquid crystal display of claim 31, wherein the first wavelength comprises in the range of about 200 nm~410 nm.

33. The liquid crystal display of claim 31, wherein the color conversion media layer comprises a red color conversion media layer, a green color conversion media layer and a blue color conversion media layer.

34. The liquid crystal display of claim 33, wherein the red color conversion media layer comprises a red phosphor, the green color conversion media layer comprises a green phosphor and the blue color conversion media layer comprises a blue phosphor.

35. The liquid crystal display of claim 31, wherein the color conversion media layer comprises quantum dots.

36. The liquid crystal display of claim 19, wherein the upper polarizer is arranged between the color conversion media layer and the liquid crystal layer.

37. The liquid crystal display of claim 36, wherein the upper polarizer is arranged between the color conversion media layer and the second substrate.

38. The liquid crystal display of claim 37, wherein a passivation layer is arranged on the color conversion media layer.

* * * * *